United States Patent [19]
Kleinschmidt et al.

[11] Patent Number: 6,160,831
[45] Date of Patent: Dec. 12, 2000

[54] WAVELENGTH CALIBRATION TOOL FOR NARROW BAND EXCIMER LASERS

[75] Inventors: Jürgen Kleinschmidt, Weissenfels; Hans-Stephan Albrecht, Göttingen; Peter Heist, Jena, all of Germany

[73] Assignee: Lambda Physik GmbH, Goettingen, Germany

[21] Appl. No.: 09/271,020

[22] Filed: Mar. 17, 1999

Related U.S. Application Data

[63] Continuation-in-part of application No. 09/179,262, Oct. 26, 1998, abandoned.

[51] Int. Cl.[7] ........................................ H01S 3/22
[52] U.S. Cl. ..................... 372/57; 372/32; 372/102; 372/107
[58] Field of Search .................. 372/57, 29, 32, 372/102, 107

[56] References Cited

U.S. PATENT DOCUMENTS

| | | | |
|---|---|---|---|
| 4,319,843 | 3/1982 | Gornall | 356/346 |
| 4,823,354 | 4/1989 | Znotins et al. | 372/57 |
| 4,905,243 | 2/1990 | Lokai et al. | 372/32 |
| 4,911,778 | 3/1990 | Barnoach | 156/466 |
| 4,914,662 | 4/1990 | Nakatani et al. | 372/32 |
| 5,142,543 | 8/1992 | Wakabayashi et al. | 372/32 |
| 5,198,872 | 3/1993 | Wakabayashi et al. | 356/352 |
| 5,218,421 | 6/1993 | Wakabayashi et al. | 356/352 |
| 5,373,515 | 12/1994 | Wakabayashi et al. | 372/20 |
| 5,404,366 | 4/1995 | Wakabayashi et al. | 372/57 |
| 5,450,207 | 9/1995 | Fomenkov | 356/416 |
| 5,748,316 | 5/1998 | Wakabayashi et al. | 372/32 |
| 5,764,678 | 6/1998 | Tada | 372/57 |
| 5,771,094 | 6/1998 | Carter et al. | 356/326 |

OTHER PUBLICATIONS

"Galvanic Detection of Optical Absorptions in a Gas Discharge", Applied Physics Letters, vol. 29, No. 11, R.B. Green, R.A. Keller, G.G. Luther, P.K. Schenck, and J.C. Travis, Dec. 1, 1976.

"Argon Fluoride Excimer Laser Source For Sub–0.2mm Optical Lithography", Optical/Laser Microlithography IV, vol. 1463, R. Sandstrom, 1991.

"Ultraviolet Optogalvanic Laser Spectroscopy of Iron for Reference Wavelengths", Optics Letters, vol. 12, No. 7, F. Babin, P Camus, J.M. Gangé, and P. Pillet, Jul. 1987.

*Primary Examiner*—Leon Scott, Jr.
*Attorney, Agent, or Firm*—Limbach & Limbach L.L.P.

[57] ABSTRACT

An excimer laser system having a precisely calibratable absolute emission wavelength is provided wherein at least one source of reference light is used. The reference light may be a laser such as a HeNe laser or a cathode lamp such as a hollow Pt, As, C, or Fe cathode lamp. The reference light and the excimer laser beam are directed along substantially the same optical path. The beams are broadened and recollimated by beam expanding optics. The broadened beams impinge upon a dispersive element, preferably an echelle grating, and various orders for each incident wavelength are dispersed. The beams are refocused onto a position sensitive detector such as a CCD camera. Different orders of one or more lines of known wavelength of the reference light and a line from the excimer laser emission are also incident at the detector simultaneously. An absolute wavelength calibration of the excimer laser emission is precisely determinable based on a position of said excimer laser emission relative to positions of the one or more lines of the reference light at the detector. The grating constant of the preferred grating and the detector are such that calibration of the central wavelength of the narrowed excimer laser emission is performable when the central wavelength is anywhere within the broadband emission spectrum of the excimer laser. A processor calculates the absolute wavelength of the excimer laser emission. Embodiments are provided for refractive optic, catadioptric, and reflective imaging systems.

97 Claims, 4 Drawing Sheets

(CUT PERPENDICULAR TO THE PAPER PLANE OF FIG. 1A)

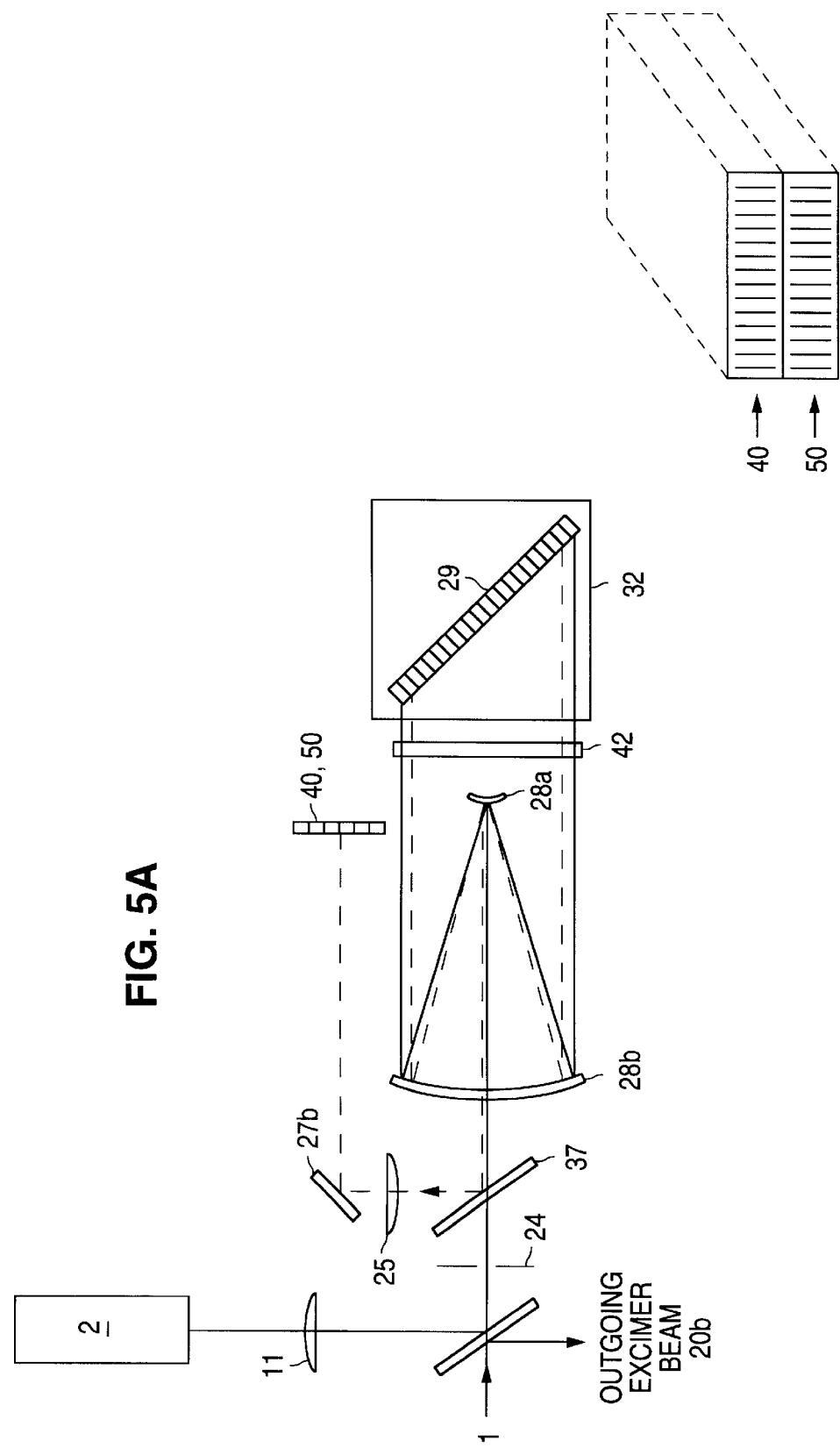

WAVELENGTH CALIBRATION TOOL FOR NARROW BAND EXCIMER LASERS

This is a Continuation-in-Part Application of application Ser. No. 09/179,262 filed Oct. 26, 1998 now abandoned.

BACKGROUND OF THE INVENTION

1. Field of the Invention

The present invention relates to a wavelength calibration technique, and particularly to a wavelength calibration technique wherein a reference beam including one or more lines of known wavelength and an excimer laser emission simultaneously impinge upon a reflection grating and a position sensitive detector, such that an absolute wavelength of the excimer laser beam may be calibrated based on relative positions of the lines at the detector.

2. Discussion of the Related Art

Narrow band excimer lasers have particular applicability in the field of photolithography of integrated circuit (IC) chips. Excimer lasers generally emit radiation at short wavelengths. KrF-and ArF-excimer lasers, e.g., emit in the deep ultraviolet (DUV) region of the electromagnetic spectrum, i.e., ~350 nm to ~190 nm, at ~248.3 nm and ~193.3 nm, respectively. $F_2$-lasers emit in the vacuum ultraviolet (VUV) region, i.e., ~190 nm to ~100 nm, at ~157.6 nm. $F_2$-lasers differ from ArF- and KrF-excimer lasers because the $F_2$ molecule is stable in the ground state, whereas the ArF and KrF molecules may only be found in an excited state. We note, however, that wherever we refer to "excimer" lasers in this application, including the claims, we intend to include the $F_2$-laser. KrF-excimer lasers are used for producing quarter and sub-quarter micron structures on IC chips. ArF-excimer lasers are used for producing structures in the range from 0.18 μm to 0.13 μm. $F_2$-lasers may be used to form even smaller structures due to their smaller output emission wavelength.

Achromatic imaging optics for the DUV and VUV wavelength ranges are difficult to produce. Very narrow bandwidth excimer laser radiation is thus needed for photolithographic application in order to prevent errors caused by chromatic aberrations. Exemplary acceptable bandwidths for different imaging systems and the KrF- and ArF-excimer laser wavelengths, i.e., 248 nm and 193 nm, respectively, are shown in Table I.

TABLE I (requirements on radiation bandwidth)

| imaging optics | λ ≈ 248 nm | λ ≈ 193 nm |
| --- | --- | --- |
| refractive optics | <0.8 pm | 0.3 pm–0.7 pm |
| catadioptics | 50 pm–100 pm | 20 pm–40 pm |

In their free running operation, excimer lasers such as KrF- and ArF-lasers have bandwidths of ~500 pm. This range of emission wavelengths is known as the broadband emission spectrum of the laser. Thus, band narrowing optics are installed within the cavities of these lasers to narrow their bandwidths to those shown in Table I.

It is also desirable to have complete tunability of the narrowed band emission of the excimer laser throughout its entire broadband emission spectrum. Thus, it is desirable to have the center wavelength of the spectrally narrowed laser emission be tunable within the entire gain curve of the laser, such that the center wavelength may be tuned through, e.g., a 200 pm to 600 pm spectral range. For most applications, it is satisfactory to have tunability in a 200 to 300 pm range around the center of the broadband emission spectrum of the laser.

Accurate and precise wavelength calibration of the center of the narrowed excimer laser emission band and its stability from pulse to pulse over time is very important. Table II shows calibration accuracies and pulse to pulse wavelength stabilities of advantageous excimer laser systems to be used in sub-quarter micron photolithographic processing.

TABLE II (requirements on wavelength (a) accuracy and (b) stability)

| | λ= 248 nm | | λ= 193 nm | |
| --- | --- | --- | --- | --- |
| imaging optics | (a) | (b) | (a) | (b) |
| refractive optics | ±0.5 pm | ±0.05 pm | ±0.5 pm | ±0.05 pm |
| catadioptics | ±10 pm | ±5 pm | ±3 pm | ±1 pm |

It is thus clear that the emission wavelength of a useful excimer laser system is measurable with high accuracy. The stability of the emission wavelength of such an excimer laser over operation time is also quite controllable. It is also desired to have a wavelength calibration system wherein the narrowed excimer laser emission wavelength, or the center of gravity of the laser emission spectrum, is compared with a known absolute calibration wavelength.

A wavemeter such as a Fabry-Perot interferometer, where interference fringes are imaged onto a CCD-camera, is normally used to determine the relative wavelength of the laser system. An additional wavelength calibration tool is used for absolute wavelength calibration. Some examples include wavelength calibration systems wherein the narrowed band is tuned through absorption lines of a photoabsorbing gas or vapor. U.S. Pat. No. 5,540,207 to Fomenkov discloses a wavelength calibration technique wherein photoabsorption of laser light by iron (Fe) vapor is used. Transmission intensity is measured as the narrowed emission traverses the Fe-vapor and the wavelength of the narrowed emission is tuned around an absorption wavelength of the Fe-vapor.

U.S. Pat. No. 4,905,243 to Lokai et al. also uses Fe-vapor which has absorption lines around the 248 nm emission wavelength of the KrF-excimer laser. Lokai uses the optogalvanic effect, rather than monitoring a straight-forward photoabsorption, for determining the absolute wavelength of the narrowed emission. Each of the Fomenkov and Lokai procedures are performed by scanning the narrowed emission through a range of wavelengths including at least one photoabsorption line of the gaseous vapor, e.g., Fe. Since the wavelength must be scanned to perform the calibration, the lithography laser system must be taken offline to carry out the procedure. As can be appreciated, no photolithographic processing can be performed as the laser system is being scanned to precalibrate the wavelength. This precalibration procedure results in undesirable system downtime.

Another known technique has been described in U.S. Pat. No. 5,404,366 to Wakabayashi et al., wherein a KrF-excimer laser output beam and a reference beam are directed together through a monitor etalon. An absolute wavelength of the output beam is determined when interference fringes from both the reference beam of known wavelength and the excimer laser output beam are detected alternately, via shuttering, in the focal plane of a condenser mirror. The two beams are not simultaneously detected due to spectral overlap at the mirror surface, yielding a first disadvantage. A second disadvantage of the arrangement of Wakabayashi et al. is that a different etalon is needed for each excimer laser source used. Moreover, a different etalon is needed even when using the same radiation source, when a different bandwidth, e.g., as determined by the optics, is being used. The "free spectral range", or applicable range of wavelengths, of the monitor etalon at any time is simply unsatisfactorily far smaller than a desired tuning range of the narrowed spectral emission. Put another way, the very high interference order ($>10^4$) of the etalon makes it difficult to clearly determine the absolute wavelength of the excimer laser beam.

SUMMARY OF THE INVENTION

It is desired to have a wavelength calibration apparatus and technique which accurately determines an absolute wavelength of a narrowed excimer laser output emission in real time and during actual application of the laser beam to its preferred use. It is therefore desired to detect both the excimer laser emission and one or more lines of a reference beam of known wavelength, simultaneously. It is further desired to calibrate an excimer laser while simultaneously, e.g., illuminating a silicon wafer at a constant and stable wavelength, rather than taking the laser offline because the wavelength calibration technique requires tuning of the laser through a range of wavelengths around a photoabsorption line. It is further desired to have a calibration technique which is applicable to any wavelength within the broadband emission spectrum of an excimer laser.

The present invention provides the desired apparatus and technique. The apparatus includes an excimer laser and band narrowing optics for generating a narrowed emission and at least one reference laser or calibration lamp source for generating a reference line of known wavelength. The apparatus further includes a dispersive element, preferably a grating, wherein each of the narrowed excimer laser emission and the reference beam of the reference laser or the light of the reference calibration lamp (hollow cathode lamp or other calibration lamp) are incident at the dispersive element. The apparatus also includes a position sensitive detector for detecting a line of the excimer laser beam of one order and a line of the reference beam of a different order as each propagates from the dispersive element in a direction dependent on its wavelength and dispersion order.

Preferably, different dispersion orders of two reference lines and a line of the excimer laser are detected. Also preferably, each of the reference and excimer laser lines is detected simultaneously. The relative positions of the lines on the detector correspond relative wavelengths and dispersion orders of the reference and excimer laser beams. Since the absolute wavelength of the reference beam is known, the absolute wavelength of the excimer laser beam can be determined by measuring pixel displacements of the lines at the detector. By using different dispersion orders, the detector may simultaneously detect each of the reference and excimer laser lines although the output emission wavelengths of the reference laser source and the excimer laser may be quite different. Moreover, the narrowed excimer laser emission wavelength may lie anywhere in the broadband spectrum of the laser. The narrowed emission is not scanned through any range of wavelengths, and may be accurately maintained at or near the desired wavelength, such as during lithographic processing. The system may therefore remain online using the calibration system of the present invention.

BRIEF DESCRIPTION OF THE DRAWINGS

FIG. 5A schematically illustrates an excimer laser system including a wavelength calibration apparatus according to a third embodiment of the present invention.

FIG. 5B shows the relative positions of two CCD arrays of the third embodiment of FIG. 5A.

DETAILED DESCRIPTION OF THE PREFERRED EMBODIMENT

Figure 1A:
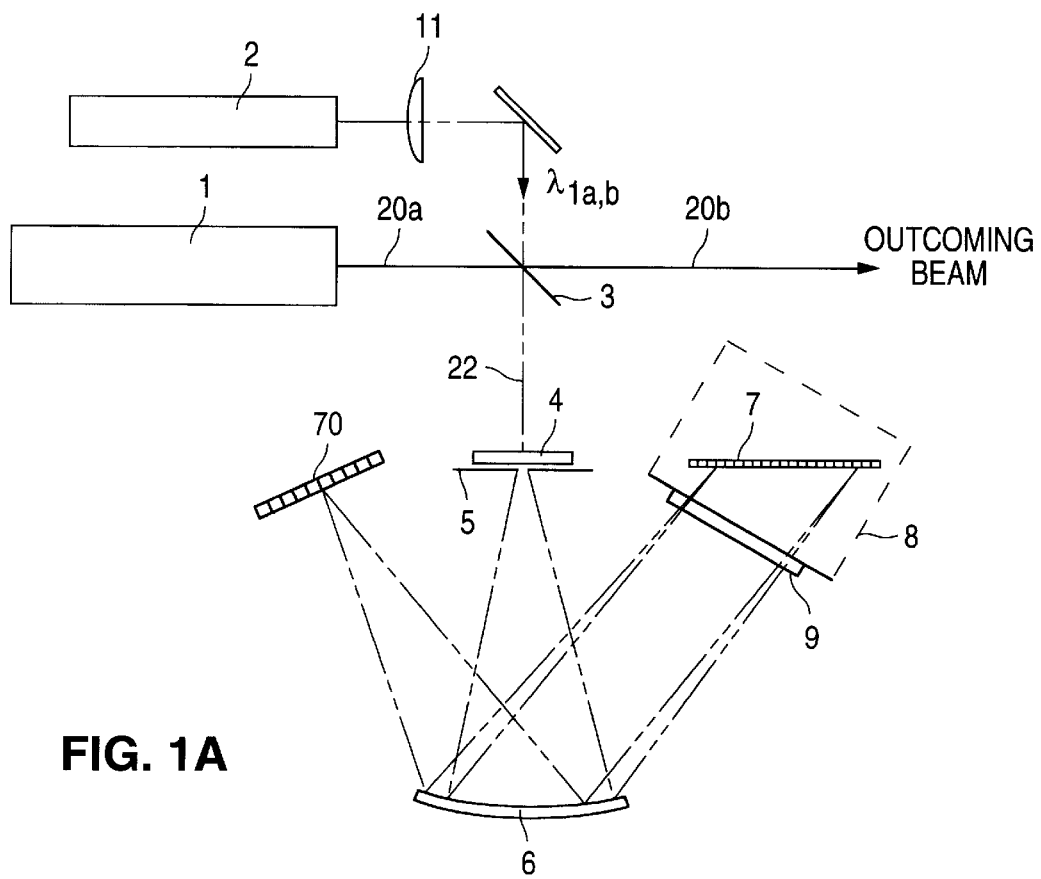
FIG. 1A schematically illustrates an excimer laser system including a wavelength calibration apparatus according to a first preferred embodiment of the present invention (elements 7 and 10 are offset in FIG. 1A).
Figure 1B:
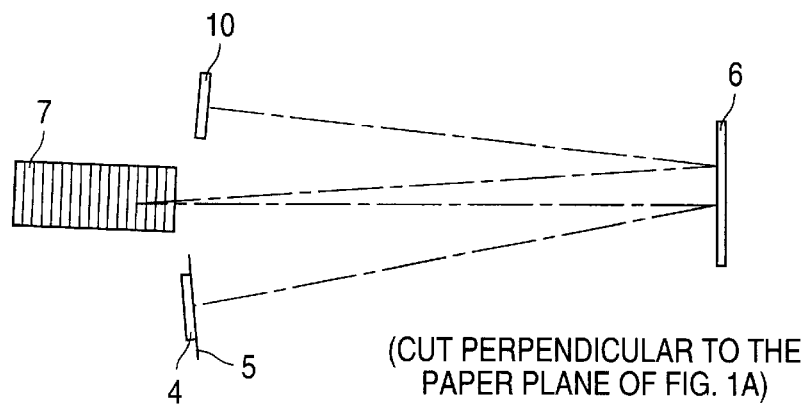
FIG. 1B shows a side view of a portion of the wavelength calibration apparatus of FIG. 1A.

FIGS. 1A & 1B schematically illustrate an excimer laser system including a wavelength calibration apparatus according to a first preferred embodiment of the present invention. It is pointed out here that both element 7 (dispersive element/grating) and element 10 (detector) are preferably actually located directly above element 5 (aperture/slit) to optimally prevent off-axis imaging. The three-dimensional arrangement of the preferred embodiment is two-dimensionally represented in FIG. 1A, and thus, the elements 7 and 10 are displaced to the right and left of element 5, respectively, only in FIG. 1A and not in the actual preferred embodiment. FIG. 1B is a side view of a portion of the apparatus of FIG. 1A, which clarifies this point, showing element 10 above element 7, and each of elements 7 and 10 above elements 4 and 5.

A laser 1, preferably an excimer laser 1, generates an output beam. Particular application of this invention is envisioned for lasers 1 such as the KrF-, ArF- and $F_2$-laser, but any of a wide variety of laser wavelengths may be calibrated using the inventive apparatus and/or technique and optics appropriate to the output wavelength of the laser 1. The output beam is preferably narrowed by optics from the natural broadband emission of the active excimer laser medium. Table I, above, again shows ranges of acceptable bandwidths when KrF- or ArF-excimer lasers are used for industrial quarter and sub-quarter micron IC chip processing.

A reference laser or calibration lamp 2 emits reference light. The reference light preferably includes at least two well known, resolvable spectral lines. The two lines of the reference light may be emitted from the same laser or calibration lamp or by different ones. The reference laser is preferably a Helium-Neon (HeNe) laser having a green line at $\lambda_{1a}$=543.5 nm and a red line at $\lambda_{1b}$=633.2 nm. Alternatively, either only one reference line may be used, or two or more reference lines, emitted by lasers and/or calibration lamps, may be used each emitting at its own characteristic wavelength. A preferred choice for calibration lamp is a hollow cathode lamp.

A beam splitter 3 redirects a portion 22 of the output beam 20a of the excimer laser 1 toward the remainder of the wavelength calibration optics. The main portion 20b of the output beam which is not redirected by the beam splitter 3 is applied to, e.g., an industrial processing technique such as IC chip processing. The wavelength calibration can be performed according to the present invention even while the output beam is being used in an industrial application, or otherwise. The output beam may be maintained at a single wavelength for calibration and need not be scanned across any range of wavelengths during calibration, although the wavelength of the output beam may be tuned to any of a range of wavelengths, e.g., within the broadband emission spectrum of the excimer laser 1.

The reference light is preferably directed to be substantially collinear with the redirected portion 22 of the output beam, or to follow the same or similar optical path as the output beam. The reference light and the redirected portion of the output beam then preferably impinge a diffuser plate 4 which generates a "spot" of light. The diffuser plate 4 is preferably composed of $CaF_2$. A slit, a circular aperture such as a pin hole 5, or another selected aperture is positioned immediately after the diffuser plate 4 along the optical path of the collinear beams. As shown in FIG. 1, a lens 11 is used to image the reference light when a reference calibration lamp is used. The lens 11 is generally not used when a reference laser is used. At the aperture 5, each of the excimer laser beam and the reference light is geometrically expanded. The expanded excimer laser beam and reference light impinge a concave mirror 6 which recollimates the diffusing beam. The mirror 6 is preferably a torique mirror for imaging the entrance aperture 5 onto an exit plane. The preferred torique mirror 6 has a different radius of curvature in two orthogonal directions. For example, the radius of curvature of the mirror 6 may be different in the horizontal direction than it is in the vertical direction. The mirror 6 also redirects the beam toward a dispersive element 7, preferably a grating. Alternatively, the dispersive element 7 may be one or more prisms or a combination of a prism and a grating.

The preferred grating 7 is further preferably a blazed grating having a selectively predetermined blaze angle. That blaze angle is preferably around 75 to 76 degrees, but may be larger or smaller depending on the particular arrangement of the optics, and the optical properties of the components of the wavelength calibration system (a more detailed determination of the blaze angle is discussed below). The grating 7 is further preferably an echelle grating. The preferred echelle grating 7 provides high resolution and efficiency, especially in our preferred arrangement wherein the angle of incidence $\theta_i$ and the angle of reflection of light from the grating 7, as well as the blaze angle $\alpha$ of the grating 7 are substantially equal or very nearly equal. Furthermore, the preferred echelle grating provides an appropriate free spectral range, i.e., useful inspection range, which is on the order of the broadband emission bandwidth of an excimer laser.

The grating 7 is sealed off in a housing 8. The housing has a window 9 preferably comprising $CaF_2$ for optical transmission of the beam into and out of the housing 8, before and after impinging the grating 7, respectively. Another material which is transmissive at each of the ultraviolet emission wavelengths of the excimer laser and the, e.g., visible wavelengths of the reference beam may also be used. The atmosphere within the housing 8 is controllable. Such criteria as temperature, pressure, air density and humidity can be precisely controlled around the grating. In this way, contaminants such as moisture are kept away from the grating surfaces. Also, temperature changes do not occur around the grating which may otherwise tend to cause changes in the grating constant d, and undermine the accuracy of the calibration technique being performed.

A plurality of lines exit the housing 8 at a variety of angles depending on their wavelengths and diffraction orders, as discussed below. The excimer laser beam and the reference light are then preferably incident at the concave mirror 6. Alternatively, the beam and the reference light may refract through a collimating lens. The concave mirror 6 this time focuses the broad collimated beam to a detector 10. The detector 10 is a position sensitive detector 10, such as a photodiode array or a CCD array.

High resolution is achieved in the preferred arrangement of FIGS. 1A & 1B. As the beam 22 passes through the aperture 5, the beam 22 becomes highly divergent. In this way, the aperture 5 functions as a highly divergent point source of light. The highly divergent light is collimated by the mirror 6, causing the rays to become substantially parallel. The result is an expanded beam having substantially parallel rays impinging upon the grating 7. Since a larger number of lines of the grating 7 act to reflect rays of the expanded beam, due to the expanded size of the beam, a higher resolution is achieved. This beam expansion in conjunction with the preferred selection of an echelle grating yields a highly advantageous optical setup in terms of resolution and dispersion.

The beam exits the housing 8 through the window 9. The beam is dispersed by the grating 7 and thus a plurality of lines propagate away from the grating 7. The dispersion is, of course, caused by the wavelength dependence of the angle at which each line reflects from the grating 7. The grating formula is given by:

$$m_i\lambda_i = 2d \sin \theta_i \quad (1),$$

where $m_i$ is the order of the ith reflected line, $\lambda_i$ is the wavelength of the ith reflected line, d is the grating constant, and $\theta_i$ is the angle of reflection of the ith line. In the preferred arrangement of FIGS. 1A & 1B, the reflection angle $\theta_i$, the blaze angle a and the angle of incidence are very nearly the same, there being very little difference between them. Also note from FIGS. 1A & 1B that not only are rays of different wavelengths $\lambda_i$ reflected from the grating 7 at different angles $\theta_i$, but potentially more than one hundred orders $m_i$ are reflected at different angles $\theta_i$ from the grating 7 for each line of incident wavelength $\lambda_i$.

Further inspection of equation (1) reveals that a pair of incident lines having very different wavelengths, e.g., $\lambda_j$ and $\lambda_k$ may also become reflected lines of very different orders, $m_j$ and $m_k$ such that the product of $m_j$ and $\lambda_j$ and the product of $m_k$ and $\lambda_k$ are very close, and thus each line is reflected from the grating 7 at very nearly the same angle, i.e., $\theta_j \cong \theta_k$. This is important since to have both the jth and kth lines reflect simultaneously onto the detector 10, as is desired, having their spacings be precisely and accurately determinable, the two lines should reflect from the grating 7 at nearly the same angle $\theta_i$. This is also important since the line or lines of the reference light are preferably in the visible range, e.g., 633.2 nm and 543.5 nm, and the excimer laser emission wavelengths of interest are in the deep and vacuum ultraviolet ranges, i.e., 248 nm, 193 nm and 157 nm, and thus the wavelengths are quite different. Again, the selection of an echelle grating is deduced to be advantageous here.

It is possible to determine a free spectral range $\alpha\lambda$ of the grating 7 by selecting its blaze angle $\alpha$ depending on the incident wavelength $\lambda_o$ of the excimer laser 1. A smaller grating constant d causes the grating 7 to have a greater free spectral range $\alpha\lambda$ according to the formula:

$$d = \lambda_o^2 / (2 \cdot \Delta\lambda \cdot \sin \alpha) \qquad (2),$$

wherein $d \leq 0.05$ mm at the KrF- and ArF-excimer laser wavelengths, 248 nm and 193 nm, respectively, and the blaze angle $\alpha \approx 75°$, such that $\Delta\lambda$ is on the order of the broadband emission bandwidths of the excimer lasers.

Consider the two beams, one being a reference line from the reference laser or calibration lamp 2 including at least one line having wavelength $\lambda_1$ and reflecting from the grating 7 at a particular order $m_1$ and deviation angle $\theta_1$ and the other being an excimer laser beam generated from the laser 1 of our preferred arrangement of FIGS. 1A & 1B having wavelength $\lambda_2$, order $m_2$ and deviation angle $\theta_2$, again, wherein the particular orders $m_1$ and $m_2$, as well as the particular wavelengths $\lambda_1$ and $\lambda_2$, may be quite different, as explained above. Each line is subject to formula (1). The detector 10 is a position sensitive detector, such as a CCD camera typically having a length of around 10 mm, and thus each increment of distance along the detector 10, as determined by the numbers of the pixels receiving light intensity, corresponds to an incremental range of wavelengths. From the geometry and trigonometry of FIGS. 1A & 1B and noting that the focal length f of the focusing optics including the mirror 6 is typically around 300 mm and that the spacing, $|x_2 - x_1|$ between two lines has to be smaller than the length of the CCD array, we find a useful condition:

$$\frac{m_2\lambda_2 - m_1\lambda_1}{m_1\lambda_1} \approx \frac{|x_2 - x_1|}{f} \cdot \frac{1}{\tan\theta_1} \leq 10^{-3}. \qquad (4)$$

Note that $\tan \theta_1 \approx \tan \alpha \approx 3.7$ when $\alpha \approx \theta_1 \approx 75$ degrees). Also note that the second reference line of the arrangement of FIGS. 1A & 1B is also subject to formula (4) with, e.g., a "1b" substituted for each "1" and each "1" changing to a "1a" to distinguish which reference line, e.g., which of the two HeNe lines, is being discussed. The excimer laser line being calibrated may be any of the family of excimer lasers having wavelength $\lambda_{2,3,etc.}$, as described above.

One reference wavelength $\lambda_1$ may be used and the distance between the reference emission line and the excimer laser emission line at the detector 10 may be measured, and the wavelength $\lambda_2$ calibrated using formula (4). Two reference lines $\lambda_{1a}$ and $\lambda_{1b}$ may be also be used. It is preferred to use the technique including two reference lines. The reason is because when only one reference line is used, calculations are performed that include determining parameters associated with the optics of the system. In the preferred technique using two reference lines, no such calculations are performed when calibrating the wavelength according to the present invention. Moreover, two reference lines are readily available because, e.g., the HeNe reference laser emits two characteristic lines.

The orders $m_3$, $m_2$ and $m_1$ are readily determinable because we know the blaze angle $\alpha \approx 76°$ and the grating constant $d^{-1} \approx 21$ mm$^{-1}$ of the grating. That is, $$2 \cdot d \cdot \sin \alpha = 92409 \text{ nm},$$

where the blaze angle $\alpha$ is again assumed to be very nearly equal to the incident angles and the deviation angles $\theta_1$ and $\theta_2$ of the beams at the grating 7, which are later incident at the detector 10. Therefore, values of $m_i \lambda_i$ around 92409 nm will be those appearing at the detector 10 when calibration is performed. Since we know the approximate absolute wavelengths of the excimer lasers we desire to calibrate and we know even more precisely the absolute wavelengths of the HeNe reference laser, we can determine the orders that will appear at the detector as follows:

$m_{1a}\lambda_{1a} = 170 \cdot 543.5$ nm $= 92395$ nm
$m_{1b}\lambda_{1b} = 146 \cdot 633.2$ nm $= 92447$ nm
$m_2\lambda_2 = 372 \cdot 248.4$ nm $= 92404$ nm
$m_3\lambda_3 = 478 \cdot 193.3$ nm $= 92397$ nm
$m_4\lambda_4 = 586 \cdot 157.6$ nm $= 92354$ nm The technique is applicable to any of a wide variety of reference and excimer laser emission wavelengths.

The resolution of the optical arrangement of FIGS. 1A & 1B is approximately given by:

$$\Delta\lambda \approx 1/f \cdot d\lambda/d\theta \cdot b = 1/f \cdot (\lambda/2 \tan \alpha) \cdot b \approx 2.5 \text{ pm},$$

where $f \approx 300$ mm is the focal length of the focusing optics, e.g., the concave mirror 6, $\alpha \approx 75°$ is the blaze angle of the grating 7, and b is the pixel dimension, or ~20 to 25 $\mu$m. Therefore, wavelength calibration and stabilization can be achieved using the wavelength calibration apparatus of the first preferred embodiment of FIGS. 1A & 1B for narrow band lasers with a bandwidth $\geq$~10 pm. That is, referring back to Table II, the first preferred wavelength calibration apparatus of FIGS. 1A & 1B has applicability for calibrating illumination sources to be used with catadioptric imaging optics.

Table III shows the wavelengths and diffraction orders of the reference laser emission lines and the excimer laser emission lines for both the KrF- (248.*) and the ArF- (193.*) excimer lasers. Table III also shows the calculated positions at the position sensitive detector of the lines embodying these wavelengths and diffraction orders.

TABLE III

|    | $\lambda_i$/nm | $m_i$ | mm   | pixel | $\lambda_{cal}$/nm |
| -- | -------------- | ----- | ---- | ----- | ------------------ |
| 1a | 543.5          | 170   | 0    | 0     | 248.374            |
| 1b | 633.2          | 146   | 3.2  | 157   | 248.514            |
| 2  | 248.4          | 372   | 0.45 | 22    |                    |
| 1a | 543.5          | 170   | 0    | 0     | 193.295            |
| 1b | 633.2          | 146   | 0.91 | 44    | 193.404            |
| 3  | 193.3          | 478   | 0.27 | 13    |                    |

The calculated positions depend on the grating constant, d, and other factors included in formula (4). The calculations of Table III were done assuming the grating constant d=(1/21) mm, the blaze angle $\alpha$ (of the grating 7)=75°, the focal length of the focusing optics f=300 mm and the calibration wavelength $\lambda_{cal}$ is given by $\lambda_{cal} = m_{cal} \cdot \lambda_1/m_1$. The position on the detector in both millimeters and pixels is shown. The calibration wavelengths $\lambda_{cal}$ are shown as calculated for each of the reference wavelengths $\lambda_{1a}$ and $\lambda_{1b}$. The calculated wavelengths are lastly shown for the excimer laser emission lines.

Figure 2A:
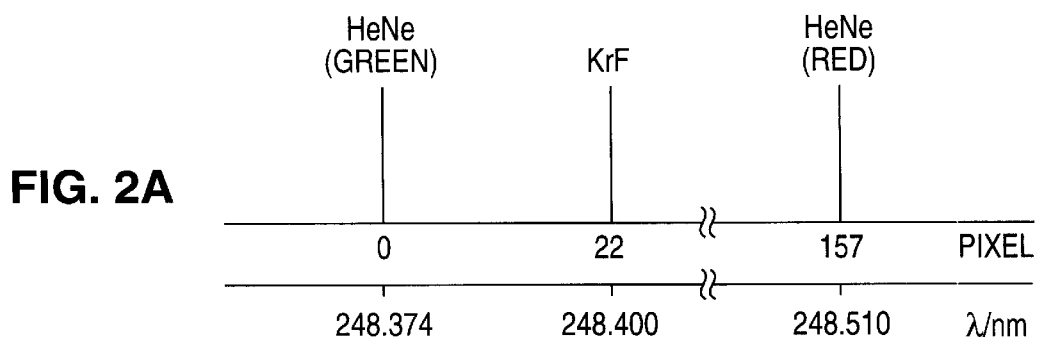
FIG. 2A illustrates a first example of the relative positions of two reference laser emission lines and a KrF-excimer laser emission line on a position sensitive detector of a preferred embodiment of the present invention, wherein the grating of Table III is used having a grating constant $d=(1/21)$ mm.

FIG. 2A illustrates the relative positions of two reference HeNe laser emission lines and the KrF-excimer laser emission line on the position sensitive detector 10, wherein the optics described with regard to Table III were used. The abscissa is the position axis, and the corresponding wavelengths for the positions of each line on the detector are shown.

FIG. 2A illustrates how the absolute wavelength of the narrowed KrF-laser emission may be precisely calibrated. The absolute wavelengths of each of the HeNe lines is known with high reliability. That is, $\lambda(\text{HeNe}_{green})=543.5$ nm and $\lambda(\text{HeNe}_{red})=633.2$ nm. The order of each line appearing at the detector 10, as shown in FIG. 2A, has been determined previously (see above). Table III shows that $m(\text{HeNe}_{green})=170$, $m(\text{HeNe}_{red})=146$, and $m(\text{KrF})=372$. The relative position of the KrF line with respect to the positions of the HeNe green line and the HeNe red line reveals the absolute wavelength of the KrF line, as follows.

In FIG. 2A, e.g., the HeNe green line is at pixel zero and the HeNe red line is at pixel 157. For $\text{HeNe}_{green}$, $m \cdot \lambda = 170 \cdot 543.5$ nm$=92395$ nm, and for $\text{HeNe}_{red}$, $m \cdot \lambda = 146 \cdot 633.2$ nm$=92447$ nm. An inspection of formula (1) reveals that the difference between these two values reflects a difference in diffraction angle from the grating 7 and results in the 157 pixel spacing between the two lines at the detector. If the KrF line were located at pixel zero, then its wavelength would be calculated as 92395 nm/372=248.374 nm, as shown. If the KrF line were located at pixel 157, then its wavelength would be calculated as 92447 nm/372=248.510 nm, as shown.

If the KrF line is located at pixel 22, as shown in FIG. 2A, now its wavelength could be calculated as follows:

(22/157)·(92447−92395)≈7, and

92395+7=92402, and

92402/372≈248.4 nm, or the calibrated wavelength of the KrF laser.

These calculations are quickly and precisely performed using a processor. If it is desired that the wavelength be 248.4 such as when the KrF laser line is located at pixel 22, and the KrF line is located at pixel 23 or 21, indicating that the wavelength is just above or below the desired wavelength, then the wavelength can be tuned until the KrF line is at pixel 22 indicating that the KrF laser is tuned to the desired wavelength. Preferably, this tuning may be performed automatically using the processor, electronics and adjustable optics.

Figure 2B:
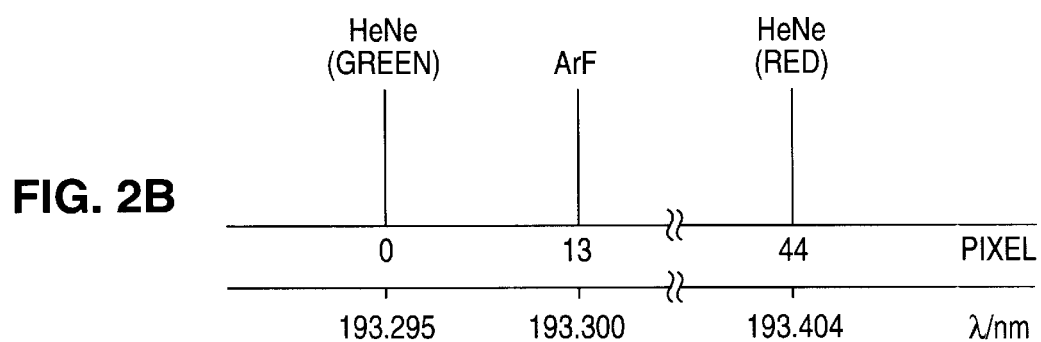
FIG. 2B illustrates a first example of the relative positions of two reference laser emission lines and an ArF-excimer laser emission line on a position sensitive detector of a preferred embodiment of the present invention, wherein the grating of FIG. 2A is used.

FIG. 2B illustrates the relative positions of the two reference HeNe laser emission lines and an ArF-excimer laser emission line on the detector 10, wherein the same criteria described with regard to FIG. 2A and Table III are used. Similar calculations are performed by the processor as were described above with respect to FIG. 2A.

Table IV shows the wavelengths and diffraction orders of the reference HeNe laser emission lines and the excimer laser emission lines for both the KrF- (248.*) and the ArF- (193.*) excimer lasers. Table IV also shows the calculated positions at the position sensitive detector 10 of the lines embodying these wavelengths and diffraction orders. The calculated positions depend on the grating constant, d, and other factors included in formula (4).

TABLE IV

|  | $\lambda_i$/nm | $m_i$ | mm | pixel | $\lambda_{cal}$/nm |
|---|---|---|---|---|---|
| 1a | 543.5 | 42 | 0 | 0 | 248.12 |
| 1b | 633.2 | 36 | −1.71 | −86 | 247.77 |
| 2 | 248.4 | 92 | 2.77 | 139 |  |

TABLE IV-continued

|  | $\lambda_i$/nm | $m_i$ | mm | pixel | $\lambda_{cal}$/nm |
|---|---|---|---|---|---|
| 1a | 543.5 | 42 | 0 | 0 | 193.45 |
| 1b | 633.2 | 36 | −3.42 | −172 | 193.17 |
| 3 | 193.3 | 118 | −1.83 | −92 |  |

The calculations of Table IV were done assuming the grating constant d=(1/85) mm, the blaze angle (of the grating 7)=75°, the focal length of the focusing optics f=300 mm and the calibration wavelength $\lambda_{cal}$ is given by $\lambda_{cal}=m_{cal} \cdot \lambda_1/m_1$. The position on the detector in both millimeters and pixels is shown. The calibration wavelengths $\lambda_{cal}$ are shown as calculated for each of the reference wavelengths $\lambda_{1a}$ and $\lambda_b$. The calculated wavelengths are lastly shown for the excimer laser emission lines.

Figure 3A:
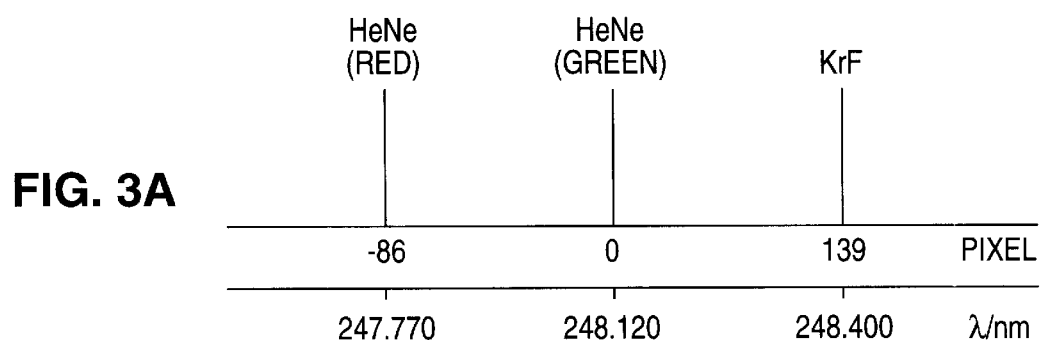
FIG. 3A illustrates a second example of the relative positions of two reference laser emission lines and a KrF-excimer laser emission line on a position sensitive detector of a preferred embodiment of the present invention, wherein the grating of Table IV is used having a grating constant of $d=(1/85)$ mm.

FIG. 3A illustrates the relative positions of the two reference HeNe laser emission lines and the KrF-excimer laser emission line on the position sensitive detector 10, wherein the optics described with regard to Table IV were used. The abscissa is the position axis, and the corresponding wavelengths for the positions of each line on the detector 10 are shown. Again, the processor calculates the absolute wavelength of the ArF-laser from the relative positions of the reference lines and the ArF-emission line.

Figure 3B:
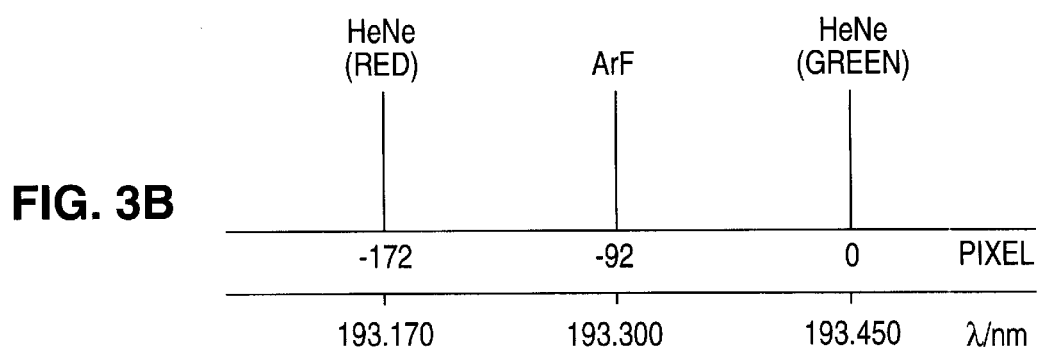
FIG. 3B illustrates a first example of the relative positions of two reference laser emission lines and an ArF-excimer laser emission line on a position sensitive detector of a preferred embodiment of the present invention, wherein the grating of FIG. 3A is used.

FIG. 3B illustrates the relative positions of the two reference lines and an ArF-excimer laser emission line on the detector 10, wherein the same criteria described with regard to FIGS. 3A and Table IV are used. Again, the processor calculates the absolute ArF-emission wavelength.

Catadioptric imaging optics typically have less chromatic aberration and therefore may operate over a wide wavelength range than conventional optics systems. Accordingly, for calibrating illumination sources to be used with purely refractive imaging optics, a wavelength calibration apparatus according to the second preferred embodiment of the present invention of FIG. 4 may be used. The apparatus of FIG. 4 provides the accuracy desired for refractive imaging optical applications.

Figure 4:
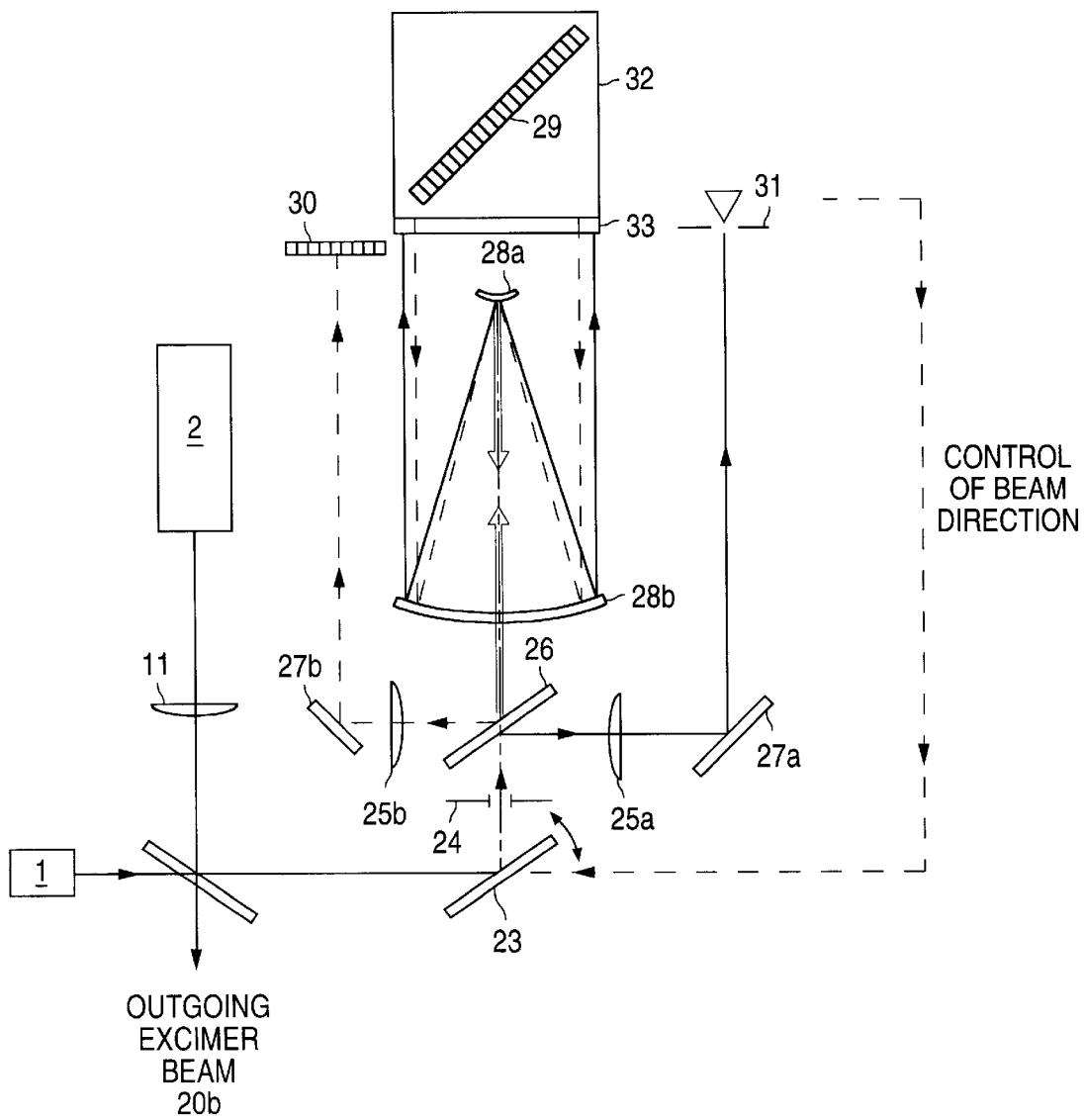
FIG. 4 schematically illustrates an excimer laser system including a wavelength calibration apparatus according to a second preferred embodiment of the present invention.

An excimer laser system according to the second preferred apparatus of FIG. 4 includes an excimer laser 1, such as a KrF-, ArF-, XeCl-, XeF-laser, etc., or an $F_2$-laser, which generates an ultraviolet output emission beam. It is noted here that wherever the term "excimer laser" is used in this application, including the claims, the term "excimer laser" is defined to include the $F_2$-laser within its scope. As with the first preferred embodiment of FIGS. 1A & 1B, almost any laser could be calibrated using the second preferred embodiment. A reference laser or calibration lamp 2, such as a HeNe laser, or a hollow cathode lamp wherein the cathode material may be one of Pt, As, C, and Fe (or another known cathode material of adequate emission characteristics) generates a reference output line. When the hollow cathode lamp is used, a lens 11 is employed for imaging the light from the calibration lamp at the slit 24. The reference output line may include multiple resolvable spectral lines, such as those emitted by the HeNe laser including a green line at around 543.5 nm and a red line at around 633.2 nm. A beam splitter (not shown) has, as with the beam splitter 3 of the first embodiment of FIGS. 1A & 1B, redirected a portion of the output beam of the excimer laser toward the wavelength calibration optics, while allowing the main portion of the output beam to proceed to perform industrial materials processing such as photolithography.

The output beam and the reference light are preferably joined such as by redirecting the reference light to be collinear with the excimer laser output beam as shown in FIG. 4. The excimer laser beam and the reference light are then redirected by a steering mirror 23. After reflecting from the steering mirror 23, the excimer laser beam and the reference light traverse an aperture 24, which may be circular such as a pin hole, or rectangular such as a narrow slit, or another selected geometry. The aperture 24 preferably has dimensions around 1 mm. The excimer laser beam and the reference light then impinge a beam splitter 26 which splits the collinear beams into two beams each of which includes a portion of each of the excimer laser beam and the reference light.

A first portion of the excimer laser beam and reference light impinges a first focusing lens 25a followed by a first planar mirror 27a. The first focusing lens 25a and first planar mirror 27a focus and redirect, respectively, the first portion of the beams to a position sensitive diode 31. The position sensitive diode 31, together with the steering mirror 23, determine and control the beam direction of the excimer laser beam and the light of the reference laser or calibration lamp. The diode 31 determines and ensures that the entrance directions through the aperture 24 of the reference light and the excimer laser beam are substantially the same.

A second portion of the excimer laser beam and reference light passes into beam expanding optics including a convex mirror 28a and a concave mirror 28b. Alternative beam expanding optics such as those conventionally used and suitable for wavelengths of application with the present invention may be used. The convex mirror 28a expands the second portion of the beam and redirects it toward the concave mirror 28b. The concave mirror 28b recollimates the now geometrically broadened beam, causing rays of the beam to become substantially parallel. The broadened, recollimated beam is also redirected by the concave mirror 28b toward a dispersive element 29, which is preferably a grating. Alternatively, the dispersive element may be one or more prisms or a combination of a prism and a grating.

The preferred grating 29 may be similar to, or different from, the grating 7 of the first preferred embodiment. The grating 29 is preferably sealed off in a housing 32. The housing has a window 33 preferably comprising $CaF_2$ for optical transmission of the beam into and out of the housing 32, before and after impinging the grating 29, respectively. Another material which is transmissive at each of the ultraviolet emission wavelengths of the excimer laser and the, e.g., visible wavelengths of the reference light may also be used. The gas density within the housing is kept substantially constant. The gas density influences the refractive index (n) of the gas and, because $\lambda = \lambda_{vacuum}/n$ the gas density influences the radiation wavelength as well.

A plurality of lines of the incident beam exit the housing 32 at a variety of angles depending on their wavelengths and diffraction orders. Again formula (1) shows the relationship between the wavelength, $\lambda_i$, the diffraction order, $m_i$, the grating constant, d, and the deviation angle of incident beams on the grating 29, wherein the deviation angle is equal to the reflection angle (as measured from a normal to the surface of the grating 29), minus the blaze angle of the grating 29. In this case, the deviation angles for each reflected line of wavelength, $\lambda_i$, and its corresponding order $m_i$ are very close, such that those lines being either calibrated or used for reference are each eventually and simultaneously incident at the position sensitive detector.

After reflecting from the grating 29 and exiting the housing 32 through the $CaF_2$ window 33, the excimer laser beam and reference light are preferably incident on the other side of the beam splitter 26 from which the first portion of the excimer laser beam and reference light were initially redirected toward the diode 31. The excimer laser beam and reference light are then focused and redirected by a second focusing lens 25b and a second planar mirror 27b toward the detector 30. The detector 30 is a position sensitive detector 30 such as a CCD camera.

The wavelength resolution of the arrangement of FIG. 4 is given approximately by:

$$\Delta\lambda \approx \phi \cdot b/D \cdot 1/F \cdot (\lambda/2 \tan \alpha) \approx 0.15 \text{ to } 0.3 \text{ pm},$$

where $\phi$ is the divergence of the excimer laser, e.g., ~0.003, b is the slit width, e.g., ~1 mm, wherein the aperture 24 is a rectangular slit, D is the diameter of the excimer laser beam, e.g., 15 to 20 mm, F is the expansion factor of the beam expander 28, e.g., ~30 to 50, and $\alpha$ is the blaze angle of the grating, e.g., ~75°, as in the first preferred embodiment of FIGS. 1A & 1B. The arrangement of FIG. 4 is thus observed to have a substantially higher resolution than the arrangement of FIGS. 1A & 1B, by one or two orders of magnitude, due to different beam divergence characteristics between the two setups.

The third preferred embodiment of the present invention is shown in FIG. 5A, and is an alternative high accuracy and high stability embodiment to the second preferred embodiment of FIG. 4, wherein the apparatus is used in refractive imaging optical applications and the accuracy and stability depicted in Table II are desired. The differences between the second and third preferred embodiments are described herebelow.

The third embodiment of FIG. 5A preferably does not include the position sensitive diode for determining and controlling the beam directions of the reference and excimer laser beams. Instead, the third embodiment includes a second position sensitive detector 50 such as a CCD array, as well as the first position sensitive detector 40 for performing a similar function as the detector 30 of the second embodiment of FIG. 4. Also, a second reflector plate 42 is included between the housing 32 which encloses and controls an atmosphere around the grating 29, and the beam expanding optics including the convex mirror 28a for diffusing the beams and the concave mirror 28b for recollimating the beams. Furthermore, the aperture 24 is located in front of a partially reflecting mirror 37, through which the two preferably substantially collinear beams enter the wavelength calibration system of the third embodiment, and the backside of the concave mirror 28b. The aperture 24 is preferably a pin hole about 1 mm in diameter or a slit about 1 mm wide and is thus similar to the aperture 24 of the second embodiment of FIG. 4. The grating 29 is preferably an echelle grating.

The partial reflector plate 42 partially reflects the incoming and geometrically broadened, or expanded, excimer laser beam and reference light. This portion of the incoming beams which is reflected at the partial reflector 42 is focused by the lens 25 and redirected by the mirror 27 to the position sensitive detector 40. The detector 40, which is preferably a CCD array or camera, gives information about any angular deviations between the reference light and the excimer laser beam during the measuring procedure. The beam direction can be adjusted based on this information, and the wavelength can be calibrated and stabilized with accuracy. The lines reflecting from the grating 29 are incident at the detector 50 for calibration processing according the above-described method.

FIG. 5B shows how the two CCD arrays 40 and 50 are arranged according to the third embodiment. Actually, the two CCD arrays 40 and 50 are each part of a single CCD array that has been functionally divided into two parts. For example, a single CCD array may be divided such that the array 40 is the upper section of the single array and receives a zeroth order reflection from the partial reflector plate 42 for monitoring the positional stability of the arrangement of FIG. 5A. The array 50 is then the lower section of the single array and receives light reflected from the grating 29 for performing spectral calibration according to the present invention. An absolute wavelength calibration derived from positions of output and reference emission lines at the array 50 is more reliable because the positional stability of the optical arrangement of FIG. 5A is monitored at the array 40.

The specific embodiments described in the specification, drawings, summary of the invention and abstract of the disclosure are not intended to limit the scope of any of the claims, but are only meant to provide illustrative examples of the invention to which the claims are drawn. The scope of the present invention is understood to be encompassed by the language of the claims, and structural and functional equivalents thereof.

What is claimed is:

1. An excimer laser system, comprising:
   an excimer laser discharge chamber and resonator for generating an output beam at a particular wavelength;
   means for generating first reference light having a known wavelength;
   a dispersive element;
   a position sensitive detector;
   optics for directing a portion of the output beam of said excimer laser and said first reference light along a common optical path including said dispersive element and said detector;
   a sensor for monitoring the alignment of said excimer laser output beam and said first reference light; and
   an adjustable optic for controlling the alignment of said excimer laser output beam an said first reference light in response to the monitoring by the sensor,
   wherein the wavelength of the output beam of the excimer laser is determined based on the position at which a line from the excimer laser beam strikes the detector relative to the position at which a line from the first reference light strikes the detector.

2. The system of claim 1, wherein the wavelength of the output beam of the excimer laser is in the ultraviolet range and the wavelength of the first reference light is outside of the ultraviolet range and the dispersive element functions to direct different orders of the beam and light onto the detector.

3. The system of claim 2, wherein the wavelength of the first reference light is in the visible range.

4. The system of claim 1, further comprising means for generating second reference light having a known wavelength different from that of the first reference light, wherein the wavelength of the excimer larger beam can also be determined based on the position at which a line from the exerciser laser beam strikes the detector relative to the respective positions at which the two lines from the first and second reference light strike the detector.

5. The system of claim 4, wherein said first reference light and said second reference light are generated each by a reference light source selected from the group reference light sources consisting of a reference laser and a reference calibration lamp.

6. The system of claim 5, wherein said reference calibration lamp is a hollow cathode lamp.

7. The system of claim 6, wherein the cathode of said hollow cathode lamp comprises one of Pt, As, C and Fe.

8. The system of claim 1, wherein the line of the excimer laser beam which strikes the detector is of a different dispersion order than the line of the first reference light which strikes the detector.

9. The system of claim 8, wherein said line of said excimer laser emission and said line of said first reference light are incident at said detector simultaneously.

10. The system of claim 1, wherein said line of said excimer laser emission and said line of said first reference light are incident at said detector simultaneously.

11. The system of claim 1, wherein said dispersive element is a grating and said line of said first reference light and a grating constant of said grating are chosen such that $$\frac{|m_2\lambda_2 - m_1\lambda_1|}{m_1\lambda_1} < \frac{L}{f} \cdot \frac{1}{\tan\theta_1},$$

where
$m_2$ is the diffraction order of said excimer laser emission at said detector, $m_1$ is the diffraction order of said first reference light at said detector, $\lambda_2$ is the absolute wavelength of the excimer laser emission, $\lambda_1$ is the absolute wavelength of the reference light, L is the dimension of the detector, f is the focal length of an imaging optic of said optics, and $\theta_1 \approx \alpha$, where $\alpha$ is a blaze angle of said grating and $\theta_1$ is an approximate angle of incidence of said beam and said first reference light at said detector.

12. The system of claim 11, wherein $m_1$ and $m_2$ represent different integers.

13. The system of claim 1, wherein a free spectral range of said dispersive element is at least substantially a tuning range of said excimer laser.

14. The system of claim 1, wherein the excimer laser is a KrF-excimer laser and the output emission wavelength of the KrF-excimer laser beam is around 248.3 nanometers.

15. The system of claim 1, wherein the excimer laser is an ArF-excimer laser and the output emission wavelength of the ArF-excimer laser beam is around 193.3 nanometers.

16. The system of claim 1, wherein the laser is a $F_2$-laser and the output emission wavelength of the $F_2$-laser beam is around 157.6 nanometers.

17. The system of claim 1, further including means for expanding said excimer beam and said reference light.

18. The system of claim 17, wherein said beam expanding means comprises beam diffusing and recollimating optics.

19. The system of claim 1, further including a diffuser plate located along said optical path before said dispersive element.

20. The system of claim 19, further comprising a concave mirror located after said diffuser plate for recollimating the excimer laser beam and the reference light before the beam and the light impinge upon said dispersive element.

21. The system of claim 1, further comprising a convex mirror located along said optical path before said dispersive element.

22. The system of claim 21, further comprising a concave mirror located after said convex mirror for recollimating the beams before the beams impinge upon said dispersive element.

23. The system of claim 1, wherein the sensor includes a position sensitive diode for detecting said excimer laser beam and said reference light before the beams impinge upon said dispersive element and detecting any angular deviations between said exerciser laser beam and said reference light to enslave that no such angular deviations are present when said calibration is performed.

24. The system of claim 1, wherein the sensor includes a second detector for detecting said excimer laser beam and said reference light before the beam and light impinge upon said dispersive element and detecting angular deviations between said beam and said light to ensure that no such angular deviations are present when said calibration is performed.

25. The system of claim 24, further comprising a partial reflector plate for redirecting a portion of said beam and said light toward said second detector.

26. The system of claim 25, wherein said partial reflector plate is wedge-shaped.

27. The system of claim 1, wherein said detector is a CCD camera.

28. The system of claim 1, further comprising means for focusing said excimer and reference light onto said detector.

29. The system of claim 1, further comprising an aperture located along said optical path.

30. The system of claim 1, wherein said dispersive element is located in a sealed housing having a controlled atmosphere and a window.

31. The system of claim 1, wherein said dispersive element is an echelle grating.

32. The system of claim 1, wherein said first reference light is generated by a reference light source selected from the group of references light sources consisting of a reference laser and a reference calibration lamp.

33. The system of claim 32, wherein said reference calibration lamp is a hollow cathode lamp.

34. The system of claim 33, wherein the cathode of said hollow cathode lamp comprises one of Pt, As, C and Fe.

35. The system of claim 1, said sensor and adjustable optic for maximizing the overlap of said excimer laser beam and reference light prior to impinging upon said dispersive element.

36. The system of claim 1, wherein said sensor includes a position sensitive diode for detecting said excimer laser beam and reference light prior to impinging upon said dispersive element.

37. The system of claim 1, wherein said sensor includes a second position sensitive detector, wherein the alignment of the output beam of the excimer laser and the reference light can be determined based on the position at which the excimer laser beam strikes the detector relative to the position at which the first reference light strikes the detector.

38. The system of claim 37, wherein said first and second detectors are located at different spaced apart locations.

39. The system of claim 37, wherein said first and second detectors are located at a same position along said common optical path.

40. The system of claim 37, wherein said second detector is a CCD array.

41. The system of claim 1, wherein said adjustable optic includes a beam steering mirror.

42. The system of claim 1, wherein said sensor monitors said alignment prior to said excimer laser beam and said reference light impinging upon said detector.

43. The system of claim 1, wherein said alignment monitoring and controlling step includes the step of adjusting a beam steering mirror.

44. A method for calibrating an absolute wavelength of an excimer laser, comprising the steps of:
generating an excimer laser beam and reference light;
directing said exciter laser beam and said reference light along an optical path including a dispersive element;
monitoring the alignment of said excimer laser beam and reference light,
controlling the alignment of said excimer laser beam and reference light in response to the monitoring;
directing a line of said reference light and a line of said excimer laser beam at a position sensitive detector; and
calibrating the wavelength of said excimer laser beam based on relative positions of said line of said excimer laser beam and said line of said reference light at said detector.

45. The method of claim 44, further comprising the steps of:
selecting the wavelength of the line of said excimer laser beam to be in the ultraviolet range;
selecting the wavelength of the line of said reference light to be outside the ultraviolet range; and
selecting the dispersive element such that it functions to direct different orders of the beams onto the detector.

46. The method of claim 45, wherein the wavelength of the reference light is selected to be in the visible range.

47. The method of claim 44, wherein said line of said reference light which is directed at said detector is of a different dispersion order than said line of said excimer laser beam which is directed at said detector.

48. The method of claim 47, wherein said line of said reference light and said line of said excimer laser beam are directed at said detector simultaneously.

49. The method of claim 44, wherein said line of said reference light and said line of said excimer laser beam are directed at said detector simultaneously.

50. The method of claim 44, wherein said dispersive element is a grating, further comprising the step of selecting the wavelength of said reference light and selecting a grating constant of said grating such that $$\frac{|m_2 \lambda_2 - m_1 \lambda_1|}{m_1 \lambda_1} < \frac{L}{f} \cdot \frac{1}{\tan \theta_1},$$

where
$m_2$ is the diffraction order of excimer laser emission at said detector, $m_1$ is the diffraction order of said line of said reference light at said detector, $\lambda_2$ is the absolute wavelength of the excimer laser emission, $\lambda_1$ is the absolute wavelength of the line of said reference light, L is the dimension of the detector, f is the focal length of an imaging optic of said optics, and $\theta_1 \approx \alpha$, where $\alpha$ is a blaze angle of said grating and $\theta_1$ is an approximate angle of incidence of said excimer laser beam and said reference light.

51. The method of claim 50, wherein $m_1$ and $m_2$ represent different integers.

52. The method of claim 50, further comprising the step of selecting an echelle grating as the dispersive element said reference light and excimer laser beam are directed to intersect with.

53. The method of claim 44, wherein said monitoring and controlling step includes the step of maximizing the overlap of said excimer laser beam and reference light prior to impinging upon said dispersive element.

54. The method of claim 53, wherein said monitoring and controlling step includes the steps of:
directing a portion of said excimer laser beam and said reference light at a second position sensitive detector prior to impinging upon said dispersive element.

55. The method of claim 54, wherein said second detector is a position sensitive diode.

56. The method of claim 54, wherein said first and second detectors are located at different spaced apart locations.

57. The method of claim 54, wherein said first and second detectors are located at a same position along said common optical path.

58. The method of claim 54, wherein said second detector is a CCD array.

59. A system for calibrating an absolute wavelength of an excimer laser, comprising:
    means for generating an excimer laser beam and reference light beam;
    means for directing said reference light and said excimer laser beam along an optical path including a dispersive element;
    means for detecting a line of said reference light and a line of said excimer laser beam, said detecting means being position sensitive;
    means for monitoring the alignment of said excimer laser beam and said reference light;
    means for controlling the alignment of said excimer laser beam and said reference light in response to the monitoring; and
    means for calibrating the wavelength of said excimer laser beam based on relative positions of said line of said excimer laser beam and said line of said reference light at said detector.

60. The system of claim 59, wherein the wavelength of the line of said excimer laser beam is in the ultraviolet range and the wavelength of the line of said reference light is outside of the ultraviolet range and the dispersive element functions to direct different orders of the beams onto the detector.

61. The system of claim 60, wherein the wavelength of the line of said reference light is in the visible range.

62. The system of claim 59, wherein said line of said reference light which is incident at said detector is of a different dispersion order than said line of said excimer laser beam which is incident at said detector.

63. The system of claim 62, wherein said lines of said reference light and said excimer laser beam of different orders are incident at said detector simultaneously.

64. The system of claim 59, wherein said means for directing said lines of said excimer laser beam and said reference light at said detector directs each of said lines at said detector simultaneously.

65. The system of claim 59, wherein said dispersive element is a grating, and a wavelength of said line of said reference light and a grating constant of said grating are selected such that $$\frac{|m_2\lambda_2 - m_1\lambda_1|}{m_1\lambda_1} < \frac{L}{f} \cdot \frac{1}{\tan\theta_1},$$

where
$m_2$ is the diffraction order of said line of said excimer laser beam at said detecting means, $m_1$ is the diffraction order of said line of said reference light at said detecting means, $\lambda_2$ is the absolute wavelength of the excimer laser beam, $\lambda_1$ is the absolute wavelength of the line of said reference light, L is the dimension of the detecting means, f is the focal length of an imaging optic of said means for directing said beams at said detecting means, and $\theta_1 \approx \alpha$, where $\alpha$ is a blaze angle of said grating and $\theta_1$ is an approximate angle of incidence of said excimer laser beam and said reference light.

66. The system of claim 65, wherein $m_1$ and $m_2$ represent different integers.

67. The system of claim 59, wherein said dispersive element is an echelle grating.

68. The system of claim 59, wherein said first reference light is generated by a reference light source selected from the group of reference light sources consisting of a reference laser and a reference calibration lamp.

69. The system of claim 68, wherein said reference calibration lamp is a hollow cathode lamp.

70. The system of claim 69, wherein the cathode of said hollow cathode lamp comprises one of Pt, As, C and Fe.

71. The system of claim 59, said alignment monitoring means and said alignment controlling means for maximizing the overlap of said excimer laser beam and reference light prior to impinging upon said dispersive element.

72. The system of claim 59, wherein said alignment monitoring means includes a position sensitive diode for detecting said excimer laser beam and reference light prior to impinging upon said dispersive element.

73. The system of claim 59, wherein said alignment monitoring means includes a second position sensitive detecting means, wherein the alignment of the output beam of the excimer laser and the reference light is determined based on the position at which the excimer laser beam strikes the second position sensitive detecting means relative to the position at which the first reference light strikes the second position sensitive detecting means.

74. The system of claim 73, wherein said first and second position sensitive detecting means are located at different spaced apart locations.

75. The system of claim 73, wherein said first and second position sensitive detecting means are located at a same position along said common optical path.

76. The system of claim 75, wherein said first and second detecting means are two array portions of a same array detector.

77. The system of claim 73, wherein said second position sensitive detecting means is a CCD array.

78. The system of claim 59, wherein said alignment controlling means includes a beam steering mirror.

79. The system of claim 59, wherein said alignment monitoring means monitors said alignment prior to said excimer laser beam and said reference light impinging upon said detector.

80. An apparatus for determining the wavelength of a beam of laser radiation, comprising:
    a source emitting light at a known wavelength different from the wavelength of the laser beam and defining reference light;
    a dispersive element positioned to intercept the laser beam and reference light, said dispersive element for dispersing the beam and the reference light into a plurality of orders wherein the outgoing direction of propagation from the dispersive element of one order of a line of the laser beam is close to the outgoing direction of propagation from the dispersive element of a different order of a line of the reference light;
    an array of photo detecting elements for measuring a position of said laser bean and said reference light dispersed from said dispersive element;
    a sensor for monitoring the alignment of the laser beam and reference light;
    an adjustable optic for controlling the alignment of the laser beam and reference light in response to the monitoring; and
    a processor for determining the wavelength of the last beam based on the relative positions on the detector array at which the laser beam and reference light strike the array.

81. The system of claim 80, wherein the wavelength of the output beam of the excimer laser is in the ultraviolet range and the wavelength of the reference light is outside of the ultraviolet range.

82. The system of claim 81, wherein the wavelength of the reference light is in the visible range.

83. The apparatus of claim 80, the optical element further for collimating the reflected working beam and reference light.

84. The apparatus of claim 80, wherein the dispersive element is a grating, and a wavelength of said reference light and a grating constant of said grating are chosen such that $$\frac{|m_2\lambda_2 - m_1\lambda_1|}{m_1\lambda_1} < \frac{L}{f} \cdot \frac{1}{\tan\theta_1},$$

where
$m_2$ is the diffraction order of said working beam at said detecting means, $m_1$ is the diffraction order of said reference light at said detecting means, $\lambda_2$ is the absolute wavelength of the working beam, $\lambda_1$ is the absolute wavelength of the reference light, L is the dimension of the detecting means, f is the focal length of an imaging optic of said means for directing said beams at said detecting means, and $\theta_1 \approx \alpha$, where $\alpha$ is a blaze angle of said grating and $\theta_1$ is an approximate angle of incidence of said beams.

85. The apparatus of claim 80, wherein said dispersive element is an echelle grating.

86. The system of claim 80, wherein said first reference light is generated by a reference light source selected from the group of reference light sources consisting of a reference laser and a reference calibration lamp.

87. The system of claim 86, wherein said reference calibration lamp is a hollow cathode lamp.

88. The system of claim 87, wherein the cathode of said hollow cathode lamp comprises one of Pt, As, C and Fe.

89. The system of claim 80, said sensor and adjustable optic for maximizing the overlap of said excimer laser beam and reference light prior to impinging upon said dispersive element.

90. The system of claim 80, wherein said sensor includes a position sensitive diode for detecting said excimer laser beam and reference light prior to impinging upon said dispersive element.

91. The system of claim 80, wherein said sensor includes a second position sensitive detector, wherein the alignment of the working beam and the reference light is determined based on the position at which the working beam strikes the second position sensitive detecting means relative to the position at which the first reference light strikes the second position sensitive detector.

92. The system of claim 91, wherein said first and second detectors are located at different spaced apart locations.

93. The system of claim 91, wherein said first and second detectors are located at a same position along said common optical path.

94. The system of claim 93, wherein said first and second detectors are two array portions of a same array detector.

95. The system of claim 91, wherein said second position sensitive detector is a CCD array.

96. The system of claim 80, wherein said adjustable optic includes a beam steering mirror.

97. The system of claim 80, wherein said sensor monitors said alignment prior to said working beam and said reference light impinging upon said detector.

* * * * *